(12) United States Patent  
Gross et al.

(10) Patent No.: US 7,552,884 B2  
(45) Date of Patent: Jun. 30, 2009

(54) DRUM SHREDDER WITH FLYWHEEL OR DISCHARGE ASSEMBLY

(76) Inventors: Thomas R. Gross, 1843 Eastern Ave., Weidman, MI (US) 48893; Earl R. Smith, 2409 W. Jordan, Mt. Pleasant, MI (US) 48858

( * ) Notice: Subject to any disclaimer, the term of this patent is extended or adjusted under 35 U.S.C. 154(b) by 0 days.

(21) Appl. No.: 11/266,768

(22) Filed: Nov. 2, 2005

(65) Prior Publication Data

US 2006/0108463 A1 May 25, 2006

Related U.S. Application Data

(60) Provisional application No. 60/269,653, filed on Feb. 16, 2001, provisional application No. 60/286,477, filed on Apr. 25, 2001, provisional application No. 60/624,299, filed on Nov. 2, 2004.

(51) Int. Cl.  
*B02C 13/20* (2006.01)

(52) U.S. Cl. .................. 241/261.1; 144/162.1; 144/172; 144/220

(58) Field of Classification Search ................... 241/91, 241/101.75, 261.1, 277, 278.1, 293, 92, 93; 144/218, 220, 162.1, 172–174  
See application file for complete search history.

(56) References Cited

U.S. PATENT DOCUMENTS

| 3,875,984 | A | * | 4/1975 | Plough .................... 144/162.1 |
| 3,944,147 | A | | 3/1976 | Pletcher |
| 3,989,198 | A | * | 11/1976 | Blasko .................. 241/101.76 |
| 4,135,563 | A | * | 1/1979 | Maucher ..................... 144/373 |
| 4,162,769 | A | * | 7/1979 | Lapointe ....................... 241/68 |
| 4,958,775 | A | * | 9/1990 | Arasmith .................... 241/88.1 |
| 5,005,620 | A | * | 4/1991 | Morey ......................... 144/373 |
| 5,209,278 | A | * | 5/1993 | Carpenter et al. ........... 144/230 |
| 5,836,528 | A | * | 11/1998 | Hilgarth ....................... 241/93 |
| 6,032,707 | A | * | 3/2000 | Morey et al. ................. 144/174 |
| 6,036,125 | A | * | 3/2000 | Morey et al. .................. 241/47 |
| 2003/0201350 | A1 | | 10/2003 | Garl |

\* cited by examiner

*Primary Examiner*—Shelley Self  
(74) *Attorney, Agent, or Firm*—Dean B. Watson

(57) ABSTRACT

A machine for reducing material that includes a rotatable cutting drum. In a preferred embodiment there is disclosed a machine for reducing material which includes a rotatable, tapered cutting drum and a flywheel. In another preferred embodiment, there is disclosed a machine for reducing material which includes a rotatable, tapered cutting drum and a discharge assembly. In still another preferred embodiment there is disclosed a machine for reducing material which includes a rotatable, tapered cutting drum, a flywheel and a discharge assembly.

22 Claims, 8 Drawing Sheets

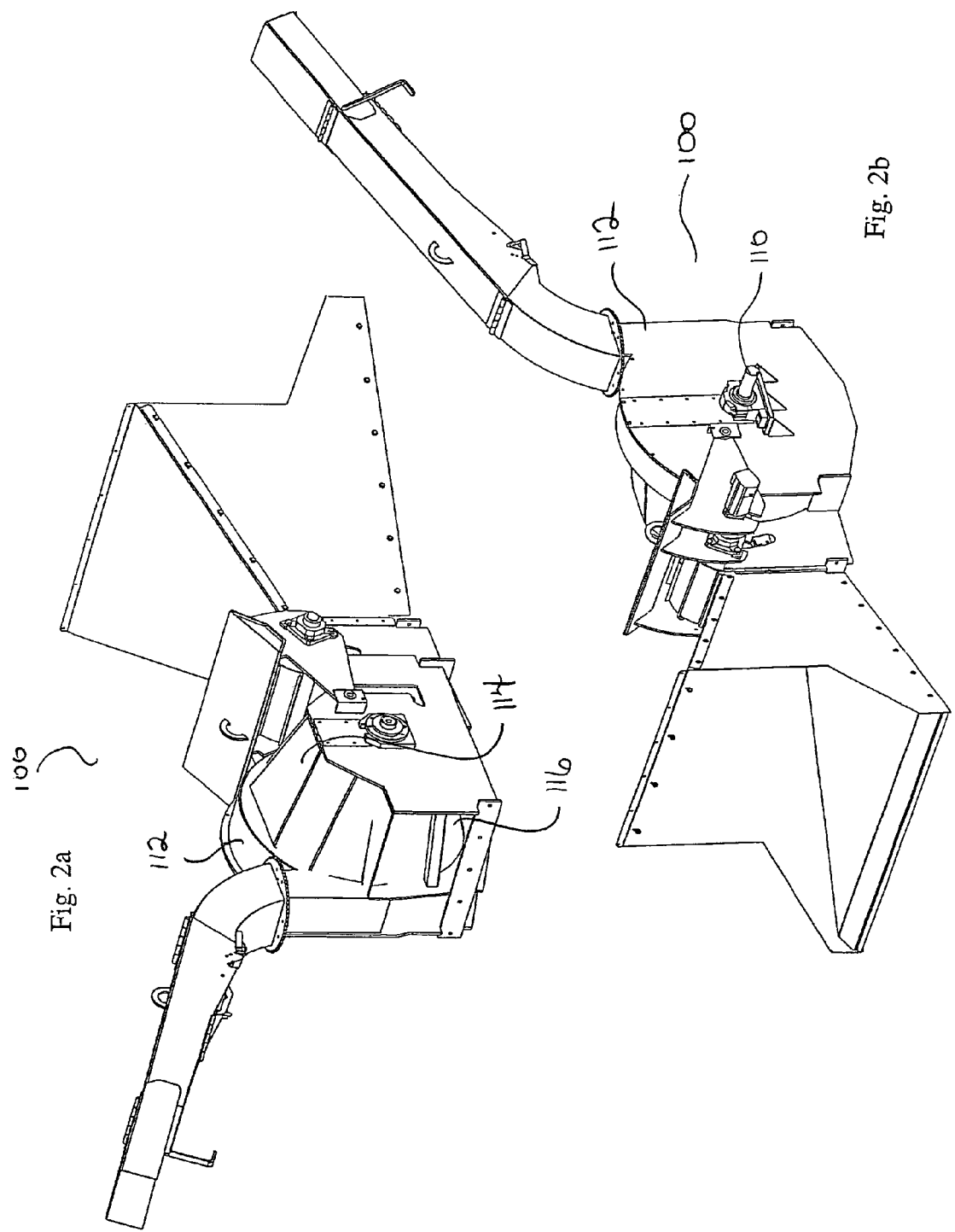

DRUM SHREDDER WITH FLYWHEEL OR DISCHARGE ASSEMBLY

CROSS-REFERENCE TO RELATED APPLICATIONS

The present invention relates to, and is entitled to the benefit of the earlier filing date and priority of: U.S. Provisional Patent Application No. 60/269,653, filed Feb. 16, 2001, entitled "Wood Collection and Reducing Machine"; U.S. Provisional Patent Application No. 60/286,477, filed Apr. 25, 2001, entitled "Wood Collection and Reducing Machine"; U.S. Non-provisional patent application Ser. No. 10/076,638 filed Feb. 16, 2002, now U.S. Pat. No. 6,824,089, entitled "Wood Collection and Reducing Machine"; U.S. Non-provisional patent application Ser. No. 10/237,007 filed Sep. 7, 2002, entitled "Wood Collection and Reducing Machine"; U.S. Non-provisional patent application Ser. No. 10/232,958 filed Aug. 31, 2002, now abandoned, entitled "Wood Collection and Reducing Machine"; and to U.S. Provisional Patent Application No. 60/624,299, filed Nov. 2, 2004, entitled "Drum Shredder With Flywheel Or Discharge Assembly" to the same inventors hereof, the disclosures of which are hereby incorporated herein by reference.

BACKGROUND OF THE INVENTION

I. Field of the Invention

The present invention relates to machines for reducing materials, including material made of wood or other fibrous materials, and more particularly to drum and disc chippers.

II. Description of the Background

Drum and disc chippers for reducing wood are generally known. New designs however are revolutionizing the industry, see for example U.S. Provisional Patent Application No. 60/269,653, filed Feb. 16, 2001, entitled "Wood Collection and Reducing Machine", U.S. Provisional Patent Application No. 60/286,477, filed Apr. 25, 2001, entitled "Wood Collection and Reducing Machine", and to U.S. Non-provisional patent application Ser. No. 10/076,638 filed Feb. 16, 2002, U.S. Non-provisional patent application Ser. No. 10/232,958 filed Aug. 31, 2002, U.S. Non-provisional patent application Ser. No. 10/237,007 filed Sep. 7, 2002, shown as publication numbers 20020113154, 20030062435, 20030071151, entitled "Wood Collection and Reducing Machine" to the same inventors hereof, the disclosures of which are hereby incorporated herein by reference in their entirety. Drum chippers are well suited for reducing large diameter logs while disc chippers are better suited for smaller diameter branches, have the advantage of lower cost and superior discharge. Therefore, what is needed is a new machine design for reducing material that can handle large diameter branches more like a drum chipper but has better material discharge efficiency like a disc chipper.

SUMMARY OF THE INVENTION

The present invention comprises a machine for reducing material that includes a rotatable cutting drum and one or more novel features as provided in the Claims below. In a preferred embodiment there is disclosed a machine for reducing material which includes a rotatable, tapered cutting drum and a flywheel. In another preferred embodiment, there is disclosed a machine for reducing material which includes a rotatable, tapered cutting drum and a discharge assembly. In still another preferred embodiment there is disclosed a machine for reducing material which includes a rotatable, tapered cutting drum, a flywheel and a discharge assembly.

For a more complete understanding of the claimed invention, reference is now made to the accompanying drawings and detailed description of preferred embodiments. Throughout the several figures and views, like symbols refer to like elements.

BRIEF DESCRIPTION OF THE DRAWINGS

FIGS. 2a-2b are perspective views shown from different angles of an embodiment of a modular component that includes a cutting head and a discharge assembly for use in a machine for reducing material;

DETAILED DESCRIPTION OF THE PREFERRED EMBODIMENTS

Figure 1A:
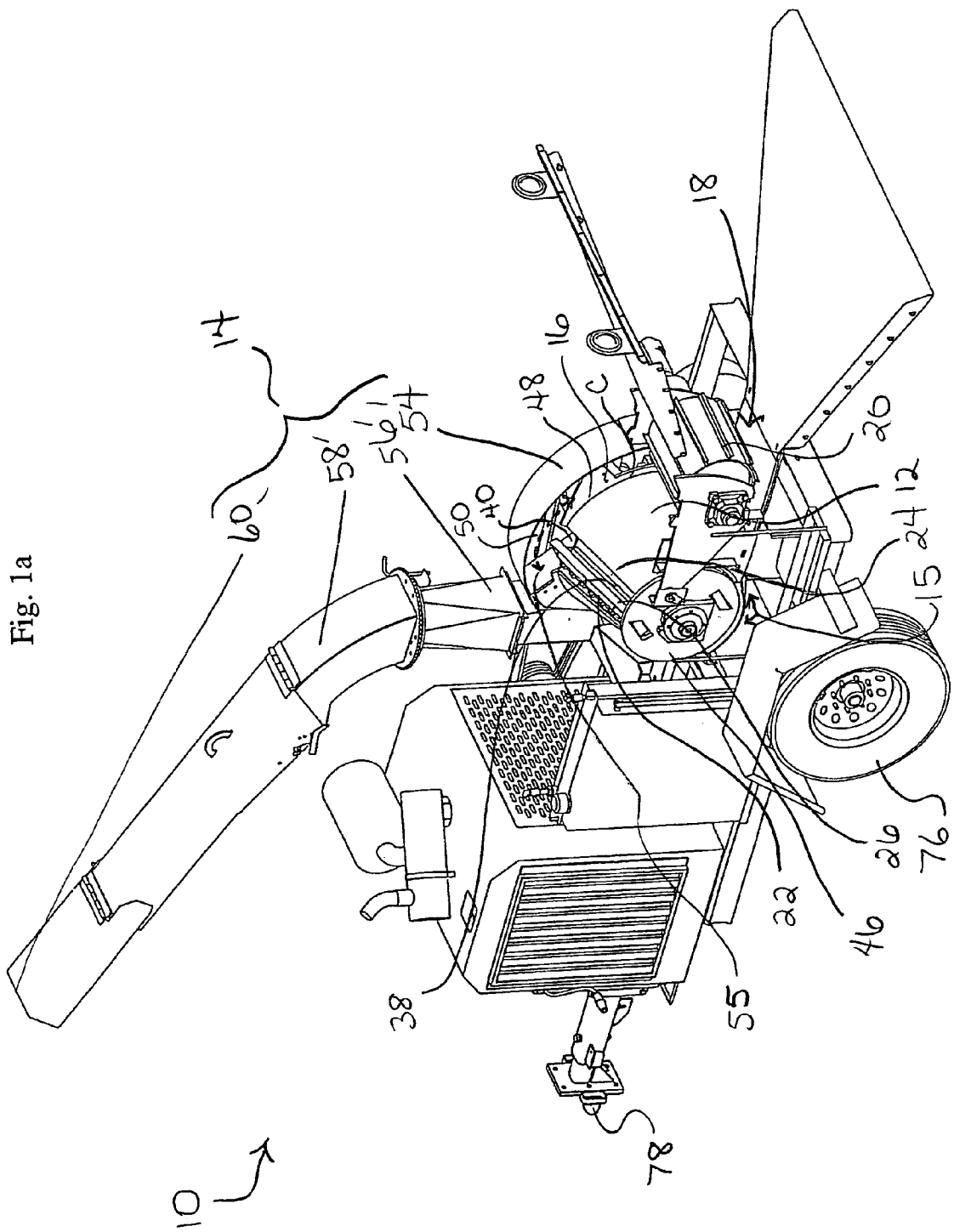
FIG. 1a is a perspective view of an embodiment of a machine for reducing material having a tapered cutting drum with a discharge assembly.

Disclosed herein are preferred embodiments of a shredder for reducing material that have one or more novel features as presented in the embodiments below.

To affect material reduction, the shredder includes a cutting drum. The cutting drum is preferably tapered. A tapered cutting drum is one that has a cross-section with an outer diameter that is smaller than an outer diameter of another cross-section of said drum. Preferred drum shapes include conical and hourglass. The cutting drum may taper as a series of steps or may taper as a gradually tapering surface over any particular section of the drum, including the entire drum. As may be appreciated, a tapered drum may have a plurality of cutting regions. The first cutting region with a larger outer diameter has a speed faster than the second cutting region. The second cutting region with a smaller outer diameter has a slower rim speed, higher torque than the first region, which can provide a higher cutting force.

The tapered cutting drum may taper towards one end, both ends, towards the center, or any combination of the above. In a preferred embodiment the drum outer diameter tapers towards an end. A drum with an outer diameter that tapers toward one end may be conical. In another preferred embodiment, the cutting drum has two ends and a middle section wherein the drum outer diameter tapers towards the middle section. A drum with an outer diameter that tapes toward the middle section may be provided as an 'hourglass' shape. A tapered cutting drum preferably provides a plurality of cutting radii with increasing torque and cutting force along the cutting axis. As may be appreciated by the findings disclosed herein, cutting force and torque can be increased as drum diameter decreases.

The tapered cutting drum preferably has a wider section and a narrower section as measured by the drum diameter. The wider section of the cutting drum (that with a larger diameter) can provide a cut that is straighter than the cut provided by the narrower section (that which has a smaller diameter) of the tapered cutting drum. The narrower section of the cutting drum in turn can provide a cut that is more cupped or curved than that produced by the wider section of the drum. Thus, a tapered cutting drum can provide a compound cut wherein the section of the drum with a larger circumference cuts more down and through the material, while the section of the drum with a smaller circumference acts more to chisel and scoop the material. This compound cutting provides enhanced draw and improved cutting efficiency. The tapered cutting drum in combination with the positioning and shape of the anvil can also improve efficiency by producing shearing action.

The cutting drum is preferably adapted to radially carry chips on the outside of the drum, and as such, may be essentially imperforate, impervious or impenetrable to reduced material so that chips may not pass radially inwardly through the outer wall or skin of the drum. A cutting drum adapted to radially carry chips on the outside of the drum may be adapted for carrying chips radially in any suitable manner, such as having a drum with a solid surface or imperforate skin, with small holes which are impenetrable by the reduced material, with a continuous outer surface that includes extended blades with a channel disposed beneath the blades, and/or by providing at least one channel in the surface of the drum for carrying chips. Preferably the cutting drum has a substantially uniform, smooth outer surface, other than the cutting implements, associated hardware, and channels.

The cutting drum may be hollow, essentially solid, or solid. However, it is noted that any channels in the surface of the drum are essentially imperforate to reduced material so that the surface of the drum still precludes reduced material from passing radially inwardly into the drum. A hollow cutting drum allows for making a larger cutting head with reduced weight, which can reduce material costs and provide ease of handling. A hollow center may also be used for fixing a drive shaft therein. A solid or essentially solid cutting drum provides a heavy member with increased stability and may also provide increased momentum so that chipping large branches does not hamper the speed of the drum or the cutting blade(s) during operation.

The cutting drum may be made of any suitable material, such as cast alloy, forged steel, cast iron, steel plate, other hard materials, etc. Preferably the drum has a skin or outer surface made of steel plate, the steel plate formed and welded on the inside to arrange the plates into a tapered drum.

In practice, wood or other material can be fed to a rotating drum where one or more cutting implements impact on the material. Lighter materials are quickly shredded by the impact of the cutting implements. Heavier branches will tend to move progressively along the incline of the tapered cutting drum to a higher torque portion thereof, which may be aided by gravity, by the design of the taper, the design of the cutting implements, by the configuration of the cutting drum, or all of the above. The high torque, slower speed region of the tapered cutting drum can then be effectively utilized to reduce large branches or other materials with improved efficiency.

The cutting drum preferably has at least one cutting implement. The cutting implement may be any suitable reducing device. The reducing device is preferably selected based on the particular shredding operation being performed. Suitable cutting implements include: blades, spikes, fixed or swinging hammers, etc. In one embodiment, the cutting implements are blades disposed about the outer surface of the drum. A cutting blade is an elongated knife(s) or chisel(s) that extend(s) longitudinally along some portion of the cutting axis of the cutting drum. Blades are particularly good cutting implements for reducing wood. Each blade may be connected to the cutting drum at an acute angle relative to the surface thereof to enhance chipping and material draw into the shredder. In one embodiment, each cutting blade extends at least 50% of the length of the cutting zone, more preferably extends at least 90%, and preferably extends substantially the entire length of the cutting zone, e.g. the region or section of a drum that comes into contact with material to be reduced.

In another embodiment, the cutting drum has a plurality of cutting implements wherein each cutting implement extends less than the entire length of the cutting drum. In a preferred embodiment each cutting implement extends 50% or less of the length of the cutting drum. Cutting implements that extend less than the length of the cutting drum may be used to reduce material draw and drum stalling. Cutting implements that extends less than the entire length of the cutting drum are preferably staggered over the surface of the drum. Staggered cutting implements can be used to control feed rate of material into the blades during operation. Staggered cutting implements are preferably distributed about the surface of the drum to give at least one full cut per drum rotation. Staggered cutting implements may also be distributed over the surface of the cutting head to increase the amount of cuts along any one section of the drum. Increased cuts may be by provided by providing certain regions along the circumference of the cutting head with more cutting implements than others. For example, along one circumference of the cutting head, there may be x cutting implements capable of making x cut(s) per revolution and along another circumference of the cutting head there may be more than x cutting implements capable of making more than x cut(s). Increasing the number cutting implements along a circumference of the cutting head may be used to increase cuts in areas where desired.

The cutting blade may be straight or curved with a straight or curve edge. Each cutting blade may have multiple edges so that the blade may be repositioned to provide a fresh, sharpened edge. The cutting implement is preferably removably attached to the drum. The cutting implement is preferably removably fixed to the drum with a blade keeper. The blade keeper is a block or bearing that may be tapped to receive one or more bolts or other fasteners to hold the blades to the drum. Each cutting blade may be formed by combining multiple, smaller blade sections together, such as by providing a number of smaller blades adjacent to one another. Multiple blade sections can provide a single edge with sections that can be replaced independently of other sections. The sections of the single edge may be of different lengths. The sections of the edge preferably include a shorter length blade section. The shorter length blade section is preferably position at a narrower section of the tapered cutting drum and more preferably at the narrowest section. It has been found that at the narrowest section of the cutting drum, the blade may receive the most wear. A smaller blade section allows this small area that receives extra wear on the blade to be replaced as needed without having to remove other sections of the blade. The cutting blade or cutting implement is preferably positioned along the drum at an angle greater the angle of the drum taper. For example, if the angle of a cutting cone drum is 45° then the angle of the blade is greater than 45°, such as 49° or 10% greater than the angle of the drum. A cutting blade angled at an angle greater than the angle of the drum taper provides enhance cutting efficiency.

The cutting drum preferably has at least one channel. Each channel may be associated with one or more cutting implements. Each channel is preferably disposed adjacent to one cutting implement so that the channel can receive reduced material from said cutting implement and more preferably precedes the cutting implement as measure by the direction of drum rotation. As shown, the channels are elongated, radially outwardly opening depressions or cups that have a set of walls and a floor which form a channel basin. The at least one channel may open at one end of the channel. In certain embodiments the at least one channel opens at the end of the drum, and preferably at the drum end that has the greatest diameter. In other embodiments it was found that the at least one channel does not have to open at either end, and may be at least partially blocked. Each channel may present a concave radially outwardly facing cross sectional configuration so as to trap reduced material on the outer surface of the drum and preclude the passage of reduced material radially inwardly into the drum into the interior of the drum. The channel preferably widens and/or deepens towards a wider end (or the end with a greater diameter) of the drum. A channel that widens and/or deepens toward the wider end of the drum is better suited for releasing reduced material without plugging. Each channel preferably has a floor or basin that is imperforate to reduced material. In a preferred embodiment each channel is disposed prior to the associated cutting implement (as measured in relation to the cutting blade and direction of drum rotation). In one embodiment the at least one channel extends the length of a cutting region, drum section or the entire cutting drum and opens at the end of the drum. In another embodiment the channel only extends the length of the associated cutting implement. The at least one channel preferably has at least one end that is blocked and may have both ends blocked. The channel may be blocked by any suitable blocking device or block, such as a wall, butt plate, blank, etc. The blocking device or block is preferably a butt plate supported by the drum. The butt plate is preferably attached to the drum at a narrower end thereof. The at least one channel may open at one end to at least temporarily communicate with a material flow chamber. The distance of the channel basin from the axis of rotation preferably increases along the channel from the narrower end to the wider end of the drum. A channel having an increasing distance from the axis of rotation allows reduced material to be accelerated with increasing speed as the material is directed towards the end of the drum, which can reduce plugging or enhance discharge.

The shredder preferably has a butt plate. The butt plate provides a surface for incoming material, such as branches or logs, to impinge against so that the cutting implements may engage incoming material without the incoming material slipping along the incline of the drum off to the side of the drum and into the housing. The butt plate is preferably coupled to the cutting drum at a narrower section of the cutting drum, which may be the end of the drum. The butt plate may be coupled with the cutting drum in any suitable manner, such as made integral therewith, attached with fasteners, welded thereto, etc. The butt plate preferably extends beyond the outer circumference of the section of the drum that the butt plate is attached, i.e. has a circumference or diameter that exceeds the circumference of the section of the drum that the butt plate is coupled. The butt plate is not fixed to any particular shape and may be a disc, ring, polygonal plate, triangular, block of metal, etc. The butt plate may be attached to the drum and may be partially enclosed by a butt plate housing. In a preferred embodiment, the butt plate is also a flywheel. A flywheel butt plate may provide a surface for incoming material to impinge upon while increasing the inertia of the cutting drum.

The shredder preferably has at least one impeller and more preferably a plurality of impellers joined with the cutting drum. The impeller(s) may be formed of any suitable material, such as an alloy, composite, plastic, etc. Preferably, the shredder has three or more impellers, four or more, five or more, or six or more impellers disposed on a flywheel or on the end of the drum to aid in reduced material discharge. The impeller(s) may aid in reduced material discharge by providing airflow through the discharge assembly and may also act as paddles to directly move and throw material that comes into contact with the impellers. The impellers are preferably evenly spaced about the outer side(s) of the cutting drum, drive shaft, or flywheel(s). Preferably, one or more of the impellers closely follow one or more of the channel(s) of the drum. The impellers preferably act to generate air currents when the drum rotates. Preferred arrangements include impellers positioned at 12, 3, 6 and 9 o'clock of the drum or flywheel. Extra impellers may also be added at 1 and 7 o'clock, etc. Extra impellers are preferably added in a manner that increase discharge efficiency while keeping rotational balance of the device they are mounted, such as the drum or the flywheel. The impellers are preferably formed, sized and angled for the type of material that the impellers are to move. The impeller(s) are preferably positioned in a material flow chamber. The impellers are preferably rigid or thick enough to handle both contacting and pushing reduced material and large enough to generate substantial air flow through the shredder to draw reduced material into the chamber and out of the shredder. The impellers preferably extend past the outer most circumference of the drum or drum skin and may be sized to give additional inertia to any drum rotation.

The shredder preferably includes a flywheel joined with the cutting drum. A flywheel is anything outside the cutting region of the drum that adds significant momentum or adds measurably to the kinetic energy of the cutting drum. The flywheel is material other than impellers, cutting implements and associated hardware, drum skin, drive shaft. The flywheel preferably has material that extends past the outer most circumference of the cutting drum. As may be appreciated by the disclosure herein, the further the flywheel material is displaced from the center of rotation, the more inertia gained.

The flywheel may be a ring, plate, flange, rim with spokes, or other suitable momentum increasing device that is joined with the cutting drum. The flywheel may be joined with the drum in any suitable manner, such as fastened directly to the cutting drum, supported by the cutting drum, supported by and connected to a drive shaft that is connected to the cutting drum, or may be made integral with the cutting drum. The flywheel may be made integral with the cutting drum by forging or casting the two as one piece. A flywheel made integral with the drum may take on the form of a radially extending flange on the end of the drum. In the case where the flywheel is made integral with the drum, the flywheel may be considered anything positioned past the outer most portion of the cutting region or past the outer tip of the knife and anything larger than that becomes the flywheel. The flywheel preferably adds at least 10% to the momentum or the inertia of the cutting drum. The flywheel is preferably disposed in the material flow chamber or the discharge assembly. The flywheel may be disposed in the middle, or at either side of the material flow chamber. Preferably the flywheel is disposed at one side of the material flow chamber with impellers attached to the side facing the inside of the material flow chamber. The fly wheel may be attached to impellers which in turn are attached to and supported by a drum.

In certain embodiments, the flywheel preferably includes one or more passages for reduced material to pass. Each passage preferably opens proximate and preceding the at least one cutting implement and tapers no more than 45 degrees radially to the outermost edge of the flywheel. The passage is preferably open to receiving material from a channel in the drum and more preferably travels with said channel. The passage preferably opens to a discharge assembly.

The shredder preferably has a discharge assembly. A discharge assembly is any device suitable for receiving reduced material from the drum and altering the direction of the reduced material in some manner. The discharge assembly preferably includes a material flow chamber. The material flow chamber is a chamber that accepts reduced material from the cutting drum for more ordered discharge. The material flow chamber is preferably disposed adjacent to the cutting drum and in material transfer communication with the at least one channel. The material flow chamber may include a housing at a side of the cutting drum that is open to the drum for receiving reduced material. The material flow chamber preferably opens to a transition or directly through a discharge port. The material flow chamber is preferably sized to accommodate the flywheel and/or impeller(s) within the material flow chamber. The material flow chamber preferably has a rounded, smooth inner surface. The rounded inner surface of the material flow chamber preferably has a circumference or diameter that is greater than the cutting drum at the cutting drums widest diameter. The inner surface preferably breaks at a discharge opening. The inner surface of the material flow chamber is preferably sized to accommodate the impellers and their rotation within a tight tolerance. The material flow chamber is preferably open on the side facing the drum all the way around the cutting drum. In certain applications the material flow chamber is preferably is open an inch and a half or less all the way around the side of the cutting drum.

The discharge assembly may further include a transition in communication with the material flow chamber. A transition is a structure or housing that allows chips to be guided away and/or upward or downward from the cutting drum to be eventually discharged from the shredder. The transition preferably tapers along some length and is in communication with a discharge port. The transition may also be connected to an extension chute that may allow further control of the discharge stream. The transition may include a series of walls, such as sidewalls, a front wall and a rear wall. The sidewalls and/or front and/or rear walls of the transition may be slanted inward. Proper slanting of the transition allows for effective narrowing of the discharge stream without excessive loss in material momentum.

The shredder preferably includes a bellyband. A bellyband provides a device for trapping reduced material in the channel(s) or on the surface of the cutting drum and generally allows material to be carried radially with the cutting drum during operation over some travel distance of the cutting drum. The bellyband preferably conforms to the shape of the cutting drum. The bellyband preferably wraps the cutting drum beginning at about the anvil and extends around the drum in the direction of drum rotation. The bellyband preferably forms part of a closed loop around the drum. The bellyband may wrap almost all the way around the drum or may only wrap as much as is necessary to keep material in the channels long enough so that at least the majority of material is discharged to the side of the drum before the bellyband ends. The bellyband preferably extends around the drum to a point where at least 90% of the chips are released from the channel(s).

In a preferred embodiment, where the cutting drum is tapered, the bellyband is preferably cupped with a wider region and a narrower region and formed in a shape that conforms with the shape of the tapered cutting drum. In the case where the cutting drum is tapered towards the middle or towards both ends, the bellyband is preferably cupped and formed with a multi-sided, and/or multi angled front wall that conforms to the angle of the tapered drum. For example, if the drum is 'hourglass' shaped, the bellyband will have a double-cupped housing or wall to accommodate the shape of the hourglass cutting drum in fairly uniform and close tolerance. The double-cupped bellyband may have a wider outer region and a narrower inner region to accommodate the bulbs of the hourglass. The space between the bellyband and the cutting drum is preferably uniform or substantially uniform along the length and width of the bellyband. The clearance or conformance of the bellyband to the cutting implements is preferably small, such as 1/8th of an inch or less and more preferably 1/16th of an inch or less. A small clearance of uniform dimension allows material or chips to be effectively carried radially with the drum so that they may flow in the channel(s) to the side of the drum.

The bellyband may be coupled with a hood that may complete an enclosed loop. The hood may form part of a housing that the cutting drum is supported on. An access panel may be provided in the hood so that the cutting drum can be accessed through the housing.

In one embodiment of a shredder having a housing disposed around the cutting drum, the housing is shaped in close proximity to the drum for trapping reduced material in the channel(s) or on the surface of the cutting drum to generally allow material to be carried radially with and transversely across the cutting drum during operation over some travel distance of the cutting drum. In a preferred embodiment said housing may be formed to open with a greater volume from a smaller diameter portion of the drum to a larger diameter portion of the drum. Having a housing formed to open with a greater volume from the smaller diameter portion of the drum to the larger diameter portion of the drum may allow more efficient travel of reduced material to the end(s) of the drum.

The shredder preferably includes an anvil. An anvil is any hard object that provides an edge that cooperates with the one or more cutting implements to help reduce material. The anvil may be a single piece or may be made up of a plurality of pieces. The anvil may be connected to the housing, removably connected to the housing or formed integral therewith. The anvil may be disposed adjacent to the cutting drum, extend along the cutting axis, and may be separated from the drum by a gap sufficient to allow drum rotation. Preferably, the anvil is a plate, which is removably mounted to the housing or other support. The anvil(s) may be translatable or movable. A translatable anvil allows the distance between the anvil and cutting drum or cutting implements to be adjusted, which may be used to regulate the size of reduced material or create a more consistent end product.

The anvil is preferably curved, such as concave or has a curved edge. A curved anvil allows a tighter tolerance with the cutting implements of a tapered cutting drum. The anvil is preferably curved to provide a substantially even or uniform distance or gap between the cutting implements (which may be straight and mounted to a tapered drum) and more preferably along substantially the entire length of each corresponding cutting implement. Thus, if the cutting implements are elongated, straight, blades mounted to a tapered cutting drum, the blades can still pass in close proximity to the curved anvil along the entire length of the cutting region.

The shredder preferably includes a housing. The housing preferably supports the cutting drum. The housing may include a frame, supports, panels, hood, cap, bearings, bellyband, chamber, etc. The housing preferably encloses the cutting drum to contain flying debris.

The shredder preferably includes a drive connected to the cutting drum. A drive is any device that provides rotation and power to the drum. The drive may include a drive shaft and a power source. The drive shaft may be connected to the power source by any suitable drive means, such as a belt drive, chain drive, electric drive, hydraulic drive, etc. Suitable power sources include electric motors, hydraulic systems, diesel engines, gas engines, etc. The cutting drum may also be supported by a stub shaft. The stub shaft may be disposed at an end opposite the drive shaft to aid in further support of the cutting drum. The stub shaft in turn may be supported by any suitable means, such as by the housing, a frame, associated brackets, etc. The drive shaft may include a key or cutout to lock the drive shaft to a connector.

The invention may be better understood with reference to the following preferred embodiments.

Figure 1B:
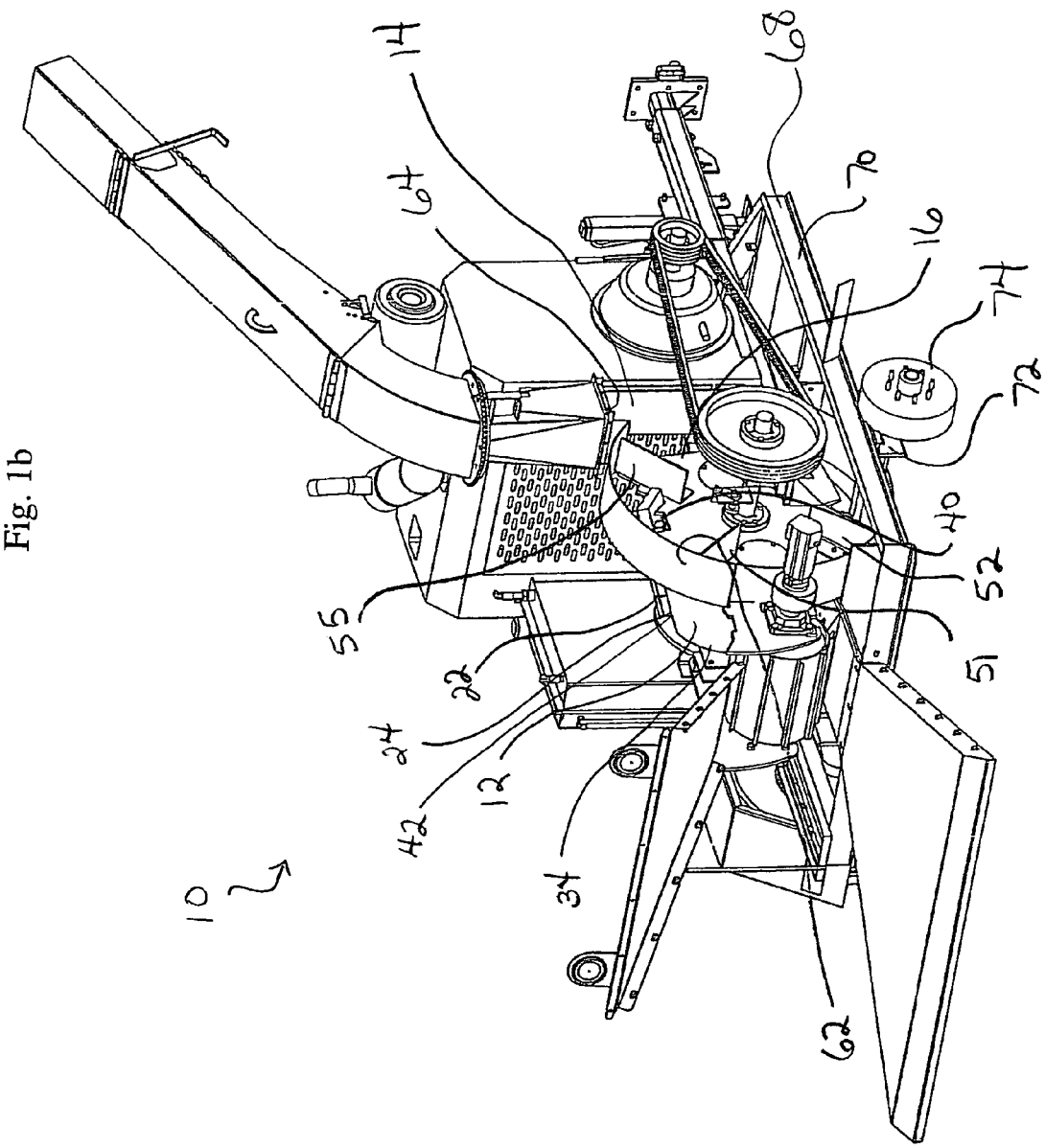
FIG. 1b is a perspective view of the embodiment of the machine for reducing material shown substantially in FIG. 1a at a different angle.
Figure 1C:
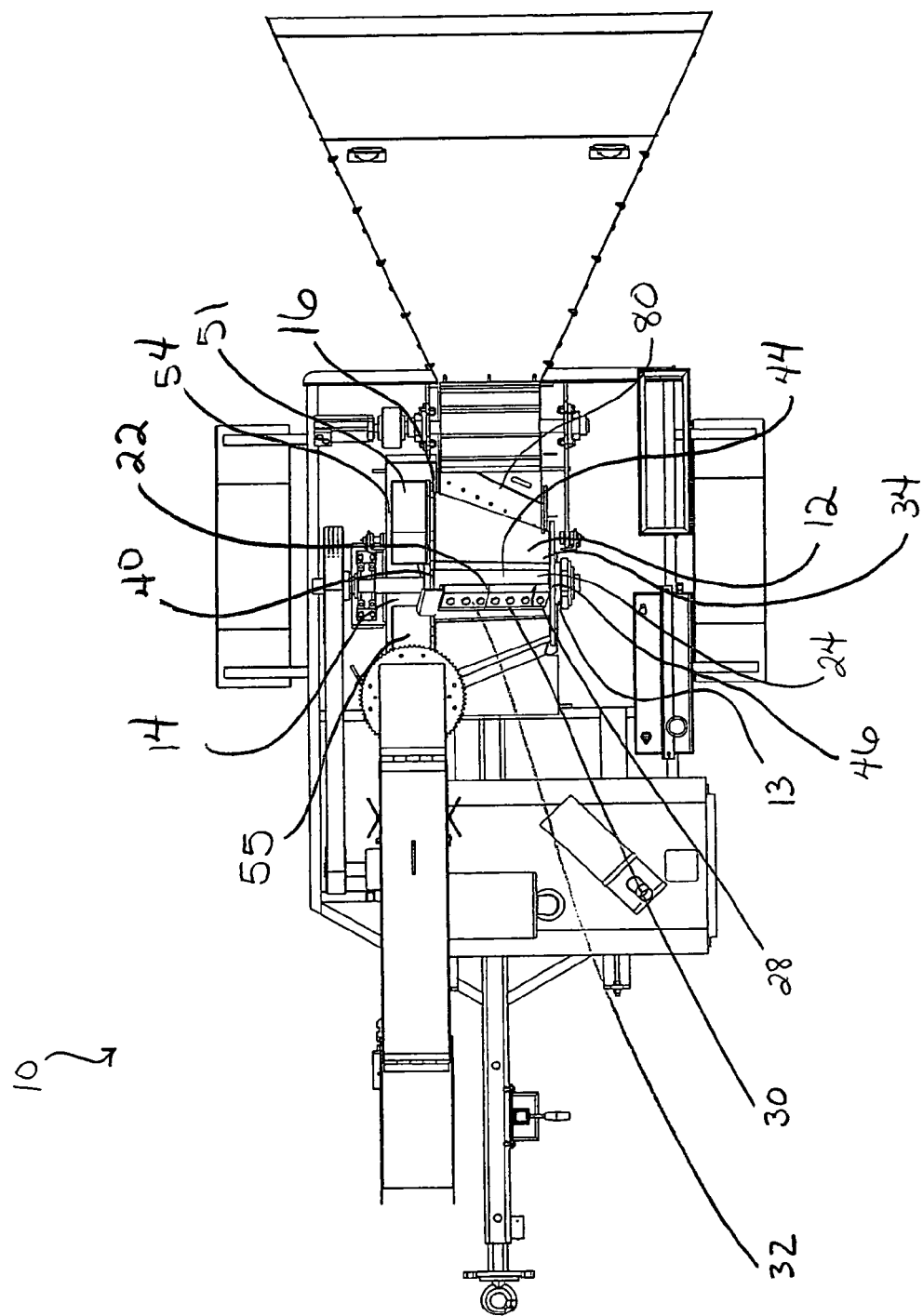
FIG. 1c is a plan view of the embodiment of the machine for reducing material shown substantially in FIG. 1a or 1b.

FIGS. 1a-1c depict a preferred embodiment of a shredder 10 having a tapered cutting drum 12, a discharge assembly 14, and a flywheel 16 with various components removed or added to aid in viewing and understanding. As configured, the shredder 10 is particularly suitable for chipping wood and other fibrous materials. The shredder 10 has an in-feed 18 where wood or other materials may be fed, reduced by the cutting drum 12, and expelled with the discharge assembly 14. The shredder also has an anvil 80.

The cutting drum 12 is supported by a support 13. The cutting drum 12 is conical with at least one cutting implement 22 and at least one channel 24. The cutting implement 22 is a cutting blade. The cutting blade is removably mounted on a keeper 26 along the length of the cutting drum. The cutting blade includes a plurality of sections 28, 30, 32 with a smaller section 28 at the smallest diameter end 34 of the drum. The channel 24 is open 38 to the surface of the drum, is open on one end 40, is blocked at another end 42, and has a basin 44 that is imperforate to reduced material. A bellyband 15 partially wraps the cutting drum 12 at a bottom portion thereof. At the smallest diameter end 34 of the drum, the drum has a butt plate 46. At the larger diameter end of the drum, the drum has a flywheel 16.

The flywheel 16 is a ring or plate joined to the drum that has material 48 which extends past the outermost circumference, C, of the drum to significantly add to the inertia of the cutting drum. The flywheel has a plurality of passages 50 (one of which is shown clearly) to allow material transfer from a corresponding channel to the discharge assembly 14. The flywheel 16 has a plurality of impellers (four in this embodiment) 51, 52, one not shown, 55 disposed around the flywheel 16. The impellers 51, 52, 53, 55 reside in the discharge assembly 14 and extend past the outer most circumference, C, of the drum.

As shown therein at 14, the discharge assembly 14 includes a material flow chamber 54, a transition 56, a discharge chute 58, and a discharge port 60 all in material transfer communication with each other. More specifically, the impellers 51, 52, 53, 55 reside in the material flow chamber 54. The impellers 51, 52, 53, 55 operate with the flywheel in a rotory fashion to move material from the material flow chamber 54 through the transition 56 out the discharge port 58. The discharge assembly 14 in turn is open to the cutting drum 12 to receive reduced material from the channel(s) 24 of the cutting drum 12. In this embodiment, the material flow chamber 54 has a smooth, rounded, inner surface 62 that is in close tolerance with the outer edges of the impellers. The rounded surface may flatten out at some portion prior to discharge. The inner surface has an opening 64 that leads to the transition 56. The transition 56 is tapered to reduce the inner volume. The transition 56 leads to an adjustable discharge chute 58 for directing the discharge of material out and away from the cutting drum 12.

The cutting drum and discharge assembly are supported on a trailer 68 having a frame 70, an axel 72 tied to the frame 70, wheels 74, 76 supported by the axel 72 and a hitch 78 attached to the frame 70. The shredder 10 also includes a feed limiter roller 20 mounted in the in-feed.

Figure 3:
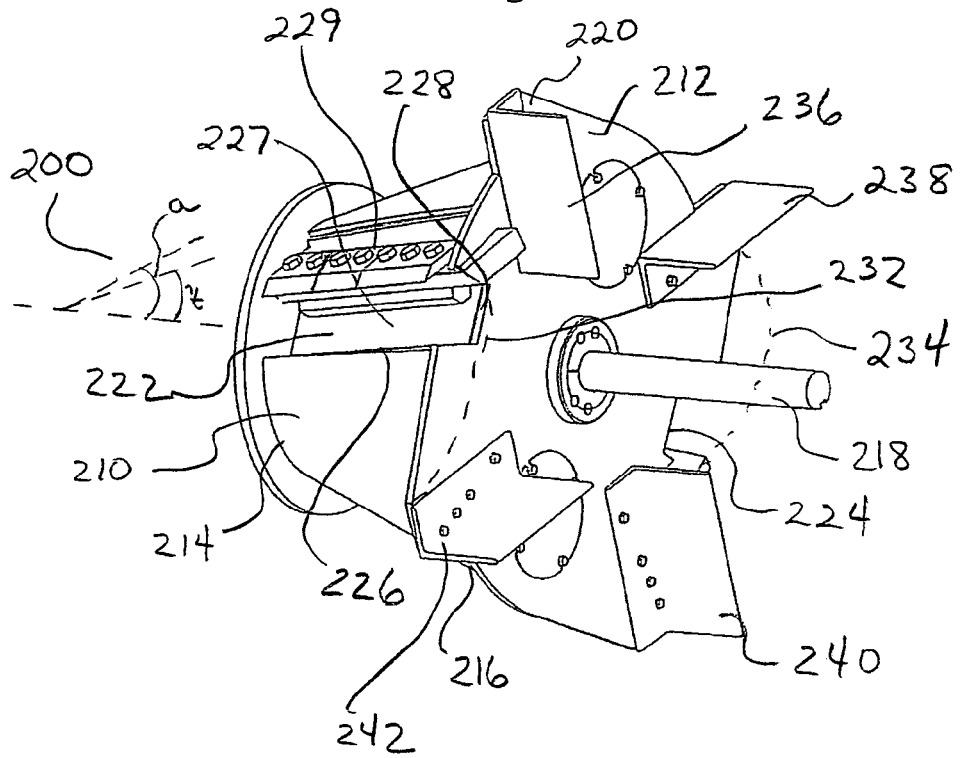
FIG. 3 is a perspective view of an embodiment of a cutting head having a cutting drum and a flywheel supported by the cutting drum.
Figure 4:
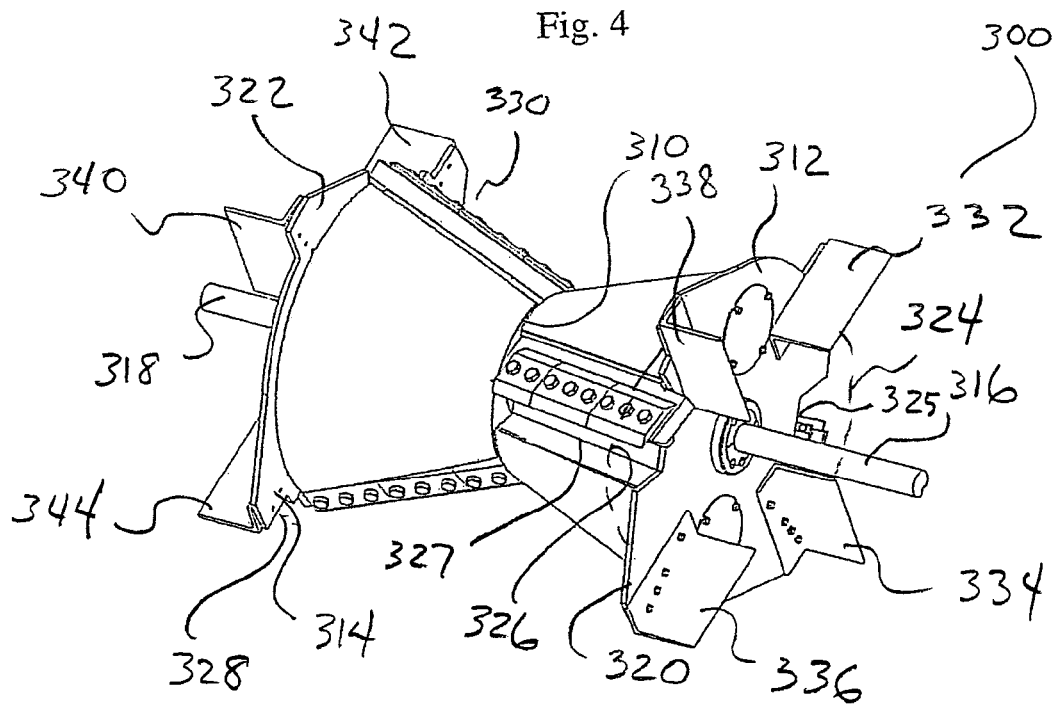
FIG. 4 is a perspective view of another embodiment of a cutting head having a cutting drum and flywheel supported by the cutting drum.

As shown in FIGS. 2-4, the cutting drum, flywheel, impellers, drive shaft, housing, and/or discharge assembly may be provided as modular components that can be attached to any number of shredder systems having different trailer packages, drives, etc. A modular system can be used for aftermarket retrofitting of a shredder in accordance with one or more embodiments of the claimed invention.

As shown in FIGS. 2a-2b, the module 100 includes a housing 110, cutting head (not shown), drive shaft 110, and a discharge assembly 112.

The cutting head includes a cutting drum rotatably mounted in the housing 110. The cutting head may be one such as the one as shown in FIG. 4. The housing includes a tapered hood 114 for partially enclosing the cutting head. The modular component also includes a bellyband 116 that cooperates with the hood to form a substantially closed loop around the drum.

FIG. 3 shows a modular cutting head 200 for a shredder that includes a tapered cutting drum 210 and a flywheel 212. The cutting head 300 shown therein includes a conical cutting drum with a narrower end 214 and a wider end 216 and flywheel 212 joined to the cutting drum at the wider end. The cutting head 200 has a shaft 218 for providing rotation. The cutting drum includes a plurality of channels 222, 224. The channels 222, 224 are disposed in the surface of the cutting drum. The channels are open at the surface 226 of the drum and open at one end 228. The channels have a basin 227 (one of which is shown) that is imperforate to reduced material. The channels extend from a narrower end to the wider end of the cutting drum. Each channel has a cutting implement 229 associated with it to receive reduced material from the corresponding cutting implement. The cutting implements are disposed about the outer surface of the cutting drum at an angle a, that is greater that the angle of the drum taper t.

The flywheel 212 is supported by the wider section 216 of the drum. The flywheel 212 has material 220 that extends past the outermost circumference of the drum. The flywheel has a plurality of passages 232, 234 to allow reduced material to pass from the channels of the drum beyond the flywheel. Impellers 236, 238, 240, 242 are disposed at the side of the drum and are supported by the flywheel. The impellers extend past the outermost circumference of the drum.

FIG. 4 shows another cutting head at 300 for a shredder that includes a tapered cutting drum 310 with a plurality of flywheels 312, 314. The cutting head shown therein includes an hourglass cutting drum and two flywheels 312, 314. The cutting head has at least one shaft to provide support to the cutting head 316. The shaft may extend through the drum or may be two separate shafts 316, 318 each connected along the center of the drum to provide the axis of rotation. The flywheels 312, 314 are supported by the wider sections (those with a greater diameter) of the drum. The flywheels have material 320, 322 that extends past the outermost circumference of the drum. The flywheels have a plurality of passages 324, 326, 328, 330 to allow reduced material to pass from the respective channels 325, 327 of the drum beyond the flywheels. Impellers 332, 334, 336, 338, 340, 342, 344, (one of which is not shown) are disposed at the sides of the drum and are supported by each respective flywheel. The impellers extend past the outermost circumference of the drum.

Figure 5:
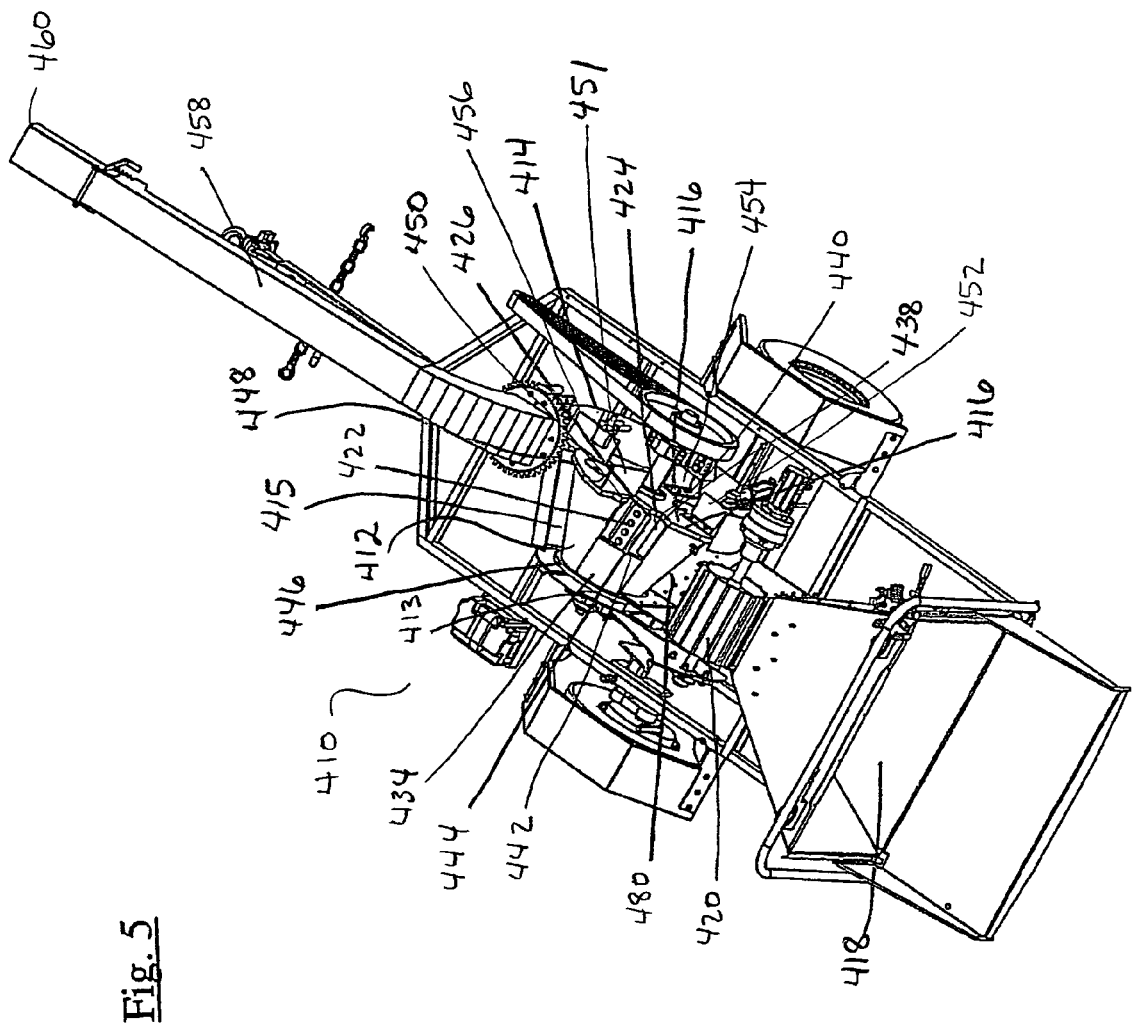
FIG. 5 is a perspective view of a machine for reducing material having a tapered cutting drum with a discharge assembly which is partially removed for ease of viewing.

As shown in FIG. 5, depicted therein is a preferred embodiment of a shredder 410 having a tapered cutting drum 412, a discharge assembly 414, and a flywheel 416 with various components removed or added to aide in viewing and understanding. As configured, the shredder 410 is particularly suitable for chipping wood and other fibrous materials. The shredder 410 has an in-feed 418 where wood or other materials may be fed, reduced by the cutting drum 412, and expelled with the discharge assembly 414. The shredder also has an anvil 480, staggered channels 424 or staggered pockets, and staggered cutting implements 422 (one of which is shown).

The cutting drum 412 (also shown in FIG. 6) is supported by a support 413. The cutting drum 412 is conical with at least one cutting implement 422 and at least one channel 424. The cutting implement 422 is a cutting blade. The cutting blade is removably mounted on a keeper 426 along some length of the cutting drum, short of the entire length. The cutting blade may include a plurality of sections with a smaller section at the smallest diameter end of the drum. One channel 424 is open 438 to the surface of the drum, is open on one end 440, is blocked at another end 442, and has a basin 444 that is imperforate to reduced material. Another channel, not shown, is open to the surface of the drum, is blocked at both ends, and has a basin that is imperforate to reduced material. A bellyband 415 partially wraps the cutting drum 412 at a bottom portion thereof. At the smallest diameter end 434 of the drum, the drum has a butt plate 446. At the larger diameter end of the drum, the drum has the flywheel 416 supported thereon.

The flywheel 416 is a ring or plate joined to the drum that has material 448 which preferably extends past the outermost circumference of the drum to significantly add to the inertia of the cutting drum. The flywheel 416 has a plurality of passages 450 (one of which is shown clearly) to allow material transfer from a corresponding channel to the discharge assembly 414. The flywheel 416 has a plurality of impellers 451, 452, 453, (four provided herein, one not shown) disposed around the flywheel 416. The impellers 451, 452, 453, reside in the discharge assembly 414 and extend past the outer most circumference of the drum.

As shown therein at 414, the discharge assembly 414 includes a material flow chamber 454, a transition 456, a discharge chute 458, and a discharge port 460 all in material transfer communication with each other. More specifically, the impellers 451, 452 reside in the material flow chamber 454. The impellers 451, 452, operate in a rotory fashion to move material from the material flow chamber 454 through the transition 456 out the discharge port 458 by generating air current and by physical contact with the material. The discharge assembly 414 in turn is open to the cutting drum 412 to receive reduced material from the channel(s) 424 of the cutting drum 412. The material flow chamber 454 has a smooth, rounded, inner surface that is in close tolerance with the outer edges of the impellers. The rounded surface may flatten out at some portion prior to discharge. The inner surface has an opening that leads to the transition 456. The transition 456 is tapered to reduce the inner volume. The transition 456 leads to an adjustable discharge chute 458 for directing the discharge of material out and away from the cutting drum 412.

The cutting drum and discharge assembly are supported on a trailer having a frame, an axel tied to the frame, wheels supported by the axel and a hitch attached to the frame. The shredder 410 also includes a feed limiter roller 420 mounted in the in-feed.

Shown in FIGS. 6, 7a-7b, and 8 are alternate embodiments of various cutting heads having a tapered cutting drum and a flywheel supported by the cutting drum. Such cutting heads may be used in the shredder of FIG. 5 with no or simple modification, such as by making the shredder a mirror image of one side in the case of an hour-glass shaped cutting head.

Figure 6:
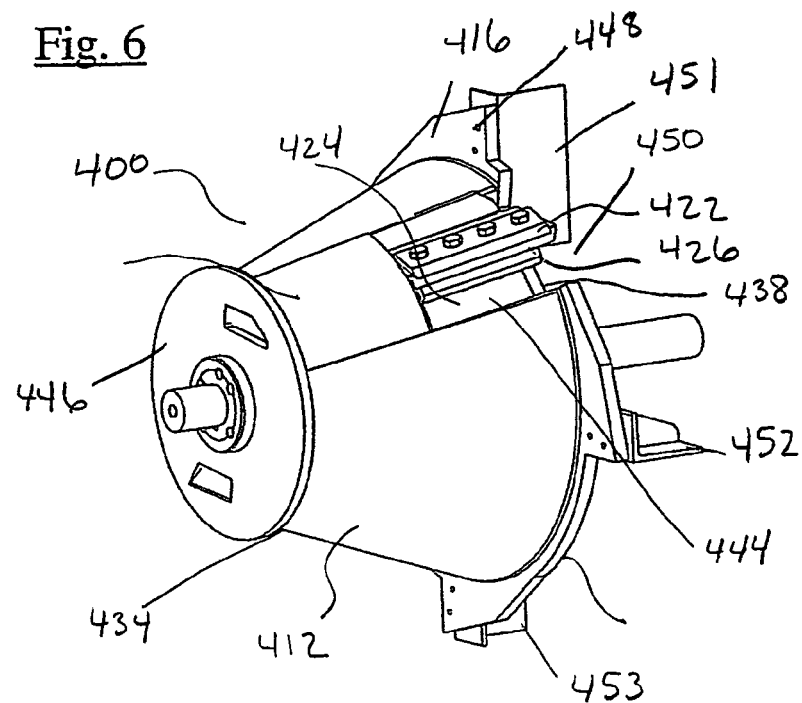
FIG. 6 is a perspective view of an embodiment of a cutting head having a cutting drum and flywheel supported by the cutting drum.

As shown in FIG. 6, the cutting head 400 has a tapered cutting drum 412 and a flywheel 416 supported by the drum. The cutting drum 412 has two staggered channels or pockets that each terminate short of the length of the drum, one of which is shown at 424 and happens to be an outside channel. Here the outside channel opens at an open end portion 438. A second inside cutting implement/pocket combination not shown may be one like that shown in FIGS. 7a. A blank 402 is provided on the tapered cutting drum 412 to cover the portions of any would-be channel section.

Figure 7A:
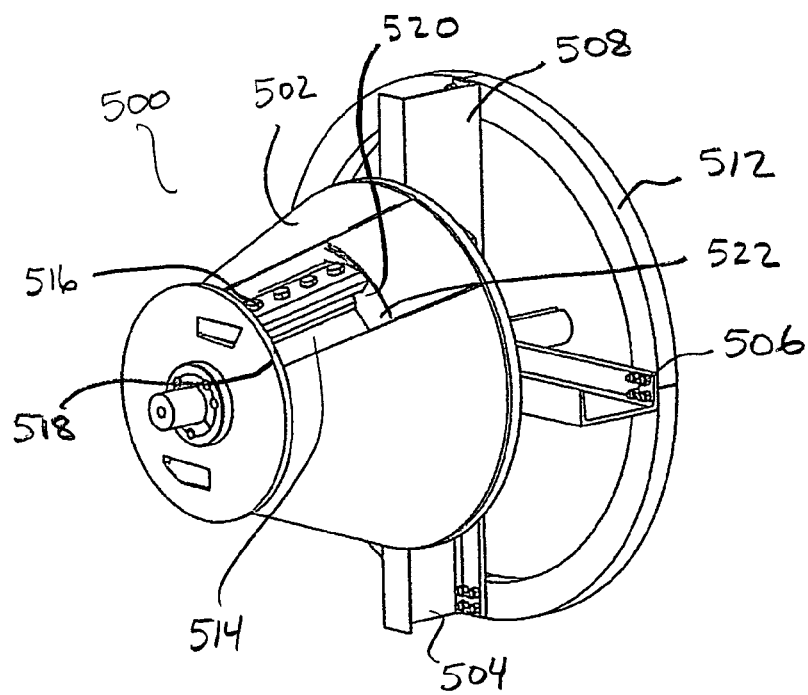
FIGS. 7a-7b is a perspective view of an embodiment of a cutting head having a cutting drum and flywheel supported by the cutting drum.
Figure 7B:
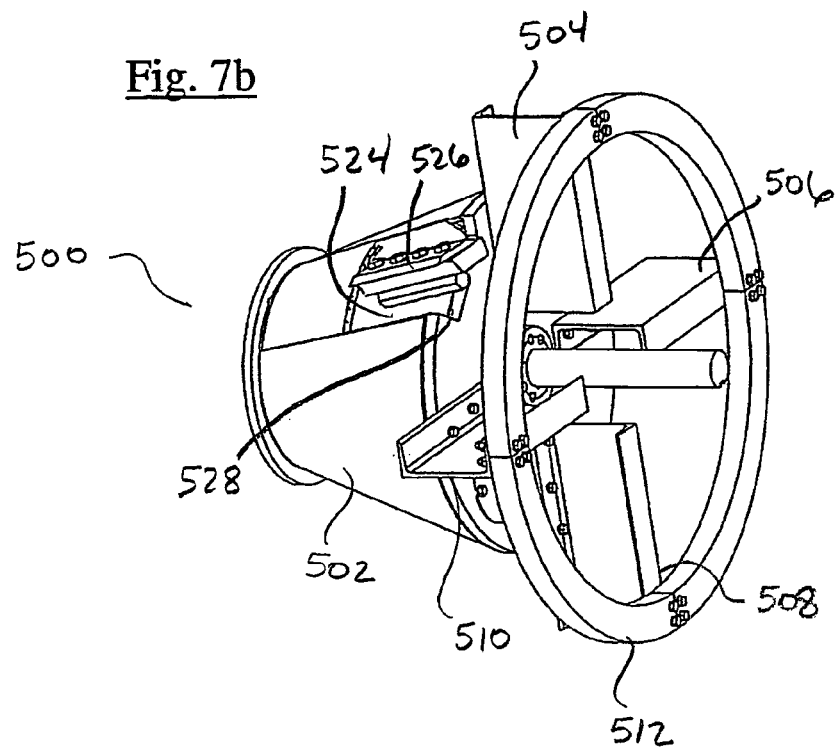

As shown in FIGS. 7a-7b, the cutting head 500 has a conical cutting drum 502, a plurality of impellers 504, 506, 508, 510 supported by the cutting drum 502 and a flywheel 512 supported by the drum. In this embodiment, the impellers are disposed between the flywheel 512 and the cutting drum 502. The flywheel 512 as shown is a ring attached to the impellers 504, 506, 508, 510. The impellers 504, 506, 508, 510 are in turn attached to the cutting drum 502. FIG. 7a shows an inside pocket 514/cutting implement 516 combination wherein the pocket 514 is blocked at both ends 518, 520. This inside pocket 514 may be completely blocked as shown or may be at least partially blocked by making the end wall 522 a ramp or similar structure. FIG. 7b shows an outside channel 524/cutting implement 526 combination with an open end portion 528.

Figure 8:
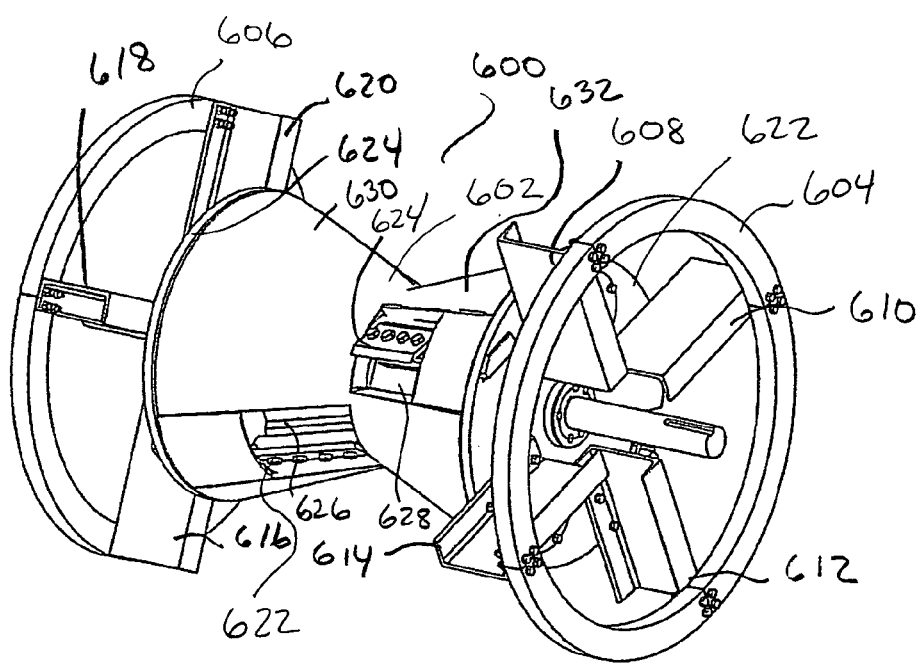
FIG. 8 is a perspective view of an embodiment of a cutting head having a cutting drum and flywheel supported by the cutting drum.

As shown in FIG. 8, the cutting head 600 has an 'hour-glass' cutting drum 602, a flywheel 604, 606 supported by each section of cutting drum and plurality of impellers 608, 610, 612, 614, 616, 618, 620, (one not shown) supported by each section 622, 624 of the cutting drum. The impellers are disposed between each flywheel on each respective section of the cutting drum. The cutting drum has cutting implements 622, 624 and respective channels or pockets 626, 628 that extend less than the length of the respective cutting regions 630, 632 and are staggered over the cutting drum (respective inside cutting pockets/cutting implements being shown). However, outside cutting pockets/cutting implements are not shown but maybe like those disclosed in FIG. 7b.

While the invention has been illustrated in the foregoing description, the same is to be considered as illustrative and not restrictive in character. For example the shredder of the present invention may be adapted for shredding tires, appliances, etc, with only slight or no modifications to the invention hereof. Therefore, it should be understood that only the preferred embodiments have been shown and described fully and that all changes and modifications that come within the spirit and scope of the claimed invention are desired to be protected.

What is claimed is:

1. A shredder for reducing material comprising a support; a tapered cutting drum rotatably mounted to the support, the tapered cutting drum having at least one channel or pocket for receiving reduced material, the at least one channel or pocket having a basin impervious to reduced material; at least one cutting implement disposed about an outer surface of the cutting drum for reducing material; a flywheel supported by the cutting drum; a discharge assembly in material flow communication with the at least one channel or pocket; and at least one impeller supported by the flywheel, the flywheel supported in the discharge assembly.

2. The shredder of claim 1, wherein the flywheel includes material extending past the outermost circumference of the cutting drum.

3. The shredder of claim 2, further comprising at least one impeller supported on the flywheel in the discharge assembly.

4. The shredder of claim 1, wherein the at least one channel or pocket is a plurality of channels or pockets that extend less than the length of the tapered cutting drum, the plurality of channels or pockets being staggered over the tapered cutting drum.

5. The shredder of claim 4, wherein the plurality of channels or pockets include at least one channel or pocket that is disposed over a smaller diameter section of the tapered cutting drum that is at least partially blocked at both ends.

6. The shredder of claim 5, wherein the plurality of channels or pockets include at least one channel or pocket that is disposed over a larger diameter section of the tapered cutting drum that is open at one end.

7. A shredder for reducing material comprising a support; a tapered cutting drum rotatably mounted on the support; the tapered cutting drum having at least one channel or pocket, the at least one channel or pocket being open at the surface of the drum, the at least one channel or pocket having a floor that is imperforate to reduced material; at least one cutting implement disposed about an outer surface of the tapered cutting drum; a chamber adjacent to the tapered cutting drum for receiving reduced material from the channel or pocket; a flywheel joined integral with the tapered cutting drum; at least one impeller joined with the tapered cutting drum, the at least one impeller extending into the chamber; and a drive connected to the tapered cutting drum.

8. The shredder of claim 7, wherein the flywheel extends beyond the outermost circumference of the cutting drum.

9. The shredder of claim 7, wherein the flywheel is a plate with passages.

10. The shredder of claim 7, further comprising a bellyband at least partially wrapping the cutting drum.

11. The shredder of claim 7, further comprising a uniformly, curved anvil disposed adjacent to the cutting drum.

12. The shredder of claim 7, wherein the flywheel includes a passage for material to pass from the at least one channel to the chamber.

13. A shredder for reducing material comprising a support; a tapered cutting drum rotatably mounted on the support; the tapered cutting drum having at least one channel or pocket, the at least one channel or pocket being open at the surface of the drum, the at least one channel or rocket having a floor that is imperforate to reduced material; at least one cutting implement disposed about an outer surface of the tapered cutting drum; a chamber adjacent to the tapered cutting drum for receiving reduced material from the channel or pocket; a flywheel joined with the tapered cutting drum; at least one impeller joined with the tapered cutting drum, the at least one impeller extending into the chamber; and a drive connected to the tapered cutting drum, wherein the tapered cutting drum is conical and has a smaller diameter section and a larger diameter section, the at least one channel or pocket including at least two channels or pockets that do not extend the length of the tapered cutting drum and are staggered over the surface of the tapered cutting drum, the at least two channels or pockets include one that is at least partially blocked at both ends and the at least one channel or pocket that is at least partially blocked at both ends is disposed over a smaller diameter section of the tapered cutting drum.

14. The shredder of claim 7, wherein the flywheel adds at least 10% to the momentum of the cutting drum.

15. The shredder of claim 7, wherein the tapered cutting drum has a smaller diameter section that includes a butt plate.

16. The shredder of claim 7, wherein the bellyband at least partially wrapping the tapered cutting drum partially defines a closed loop around the drum so that material can only escape to a side of the cutting drum.

17. A shredder for reducing material comprising a support; a conical cutting drum rotatably mounted on the support, the conical cutting drum having a narrower end and a wider end; a flywheel joined with the cutting drum, the flywheel extending past the outer circumference of the drum; the cutting drum having at least one channel, the channel being open at the surface of the drum and open to one end, the channel having a floor imperforate to shredded material; at least one cutting implement disposed about an outer surface of the cutting drum; a material flow chamber disposed to the side of the cutting drum and in material transfer communication with the at least one channel; a plurality of impellers operatively disposed in the material flow chamber; a discharge port in communication with the material flow chamber; a bellyband at least partially wrapping the cutting drum and a drive connected to the cutting drum, wherein the flywheel has at least one passage for material transfer between the at least one channel of the drum and the material flow chamber.

18. The shredder of claim 17, wherein the drum includes a stop attached to the narrower end, the stop having a diameter that is greater than the diameter of the narrower end.

19. The shredder of claim 17, wherein the flywheel is supported by the drum.

20. The shredder of claim 17, wherein the flywheel is disposed within the material flow chamber.

21. The shredder of claim 17, wherein the flywheel is a plate attached to the drum, the plate having at least one passage for material transfer between the at least one channel of the drum and the material flow, the passage sized to not reduce the combined momentum and discharge effect of the flywheel extending past the outer circumference of the drum by more than 50%.

22. The shredder of claim 17, wherein the passage opens proximate and preceding the at least one cutting implement and tapers no more than 45 degrees radially to the outermost edge of the flywheel.

* * * * *